United States Patent [19]

Fuchigami et al.

[11] Patent Number: 4,692,129

[45] Date of Patent: Sep. 8, 1987

[54] TIMING CHAIN DRIVE

[75] Inventors: Wataru Fuchigami, Iwata; Yoshiharu Nakayama, Hamamatsu, both of Japan

[73] Assignee: Yamaha Motor Co., Ltd., Japan

[21] Appl. No.: 5,320

[22] Filed: Jan. 15, 1987

Related U.S. Application Data

[63] Continuation of Ser. No. 753,643, Jul. 10, 1985, abandoned.

[30] Foreign Application Priority Data

Jul. 27, 1984 [JP] Japan ................................ 59-155469

[51] Int. Cl.⁴ ................................................ F16H 7/06

[52] U.S. Cl. .................................. 474/148; 123/90.31

[58] Field of Search ................. 474/148; 123/197 AC, 123/90.31; 74/15.63

[56] References Cited

U.S. PATENT DOCUMENTS 4,155,333 5/1979 Maggiovana ................ 123/90.31 X 4,305,352 12/1981 Oshima et al. ............... 123/90.31 X 4,505,235 3/1985 Mitchell .......................... 123/90.31

*Primary Examiner*—Stephen J. Novosad

*Assistant Examiner*—Thuy M. Bui

*Attorney, Agent, or Firm*—Ernest A. Beutler

[57] ABSTRACT

A timing chain arrangement for the overhead camshafts of an internal combustion engine wherein the driving sprocket on the crankshaft has a smaller dedendum diameter than an adjacent crankshaft bearing surface.

1 Claim, 2 Drawing Figures

TIMING CHAIN DRIVE

This is a continuation of U.S. patent application Ser. No. 753,643, filed July 10, 1985, now abandoned.

BACKGROUND OF THE INVENTION

This invention relates to a timing chain drive and more particularly to an improved arrangement for driving an overhead mounted camshaft from the crankshaft of an internal combustion engine.

As is well known, internal combustion engines operating on the four-stroke cycle normally employ poppet valves that are operated by a camshaft that is driven at one-half crankshaft speed by a suitable timing mechanism. Advantageously, the camshaft is mounted in the cylinder head for operating overhead valves. Frequently, there are two camshafts employed for operating the valves associated with a single cylinder. Because of the timing relationship between the crankshaft speed and the camshaft speed, the sprockets or gears on the respective camshaft and crankshaft determine the overall size of the engine. It is, of course, desirable to maintain a very compact construction for the engine but this is difficult if not impossible with the type of timing drives previously employed.

It is, therefore, a principal object of this invention to provide an improved camshaft driving arrangement for an internal combustion engine.

It is another object of this invention to provide an improved and compact drive for the overhead camshafts of an internal combustion engine.

SUMMARY OF THE INVENTION

This invention is adapted to be embodied in a timing drive for driving an overhead mounted camshaft from the crankshaft of an internal combustion engine. The crankshaft has at least one main bearing surface formed on it for journaling the crankshaft for rotation. A sprocket is positioned adjacent the main bearing surface for driving the camshaft. The sprocket has a dedendum diameter smaller than the diameter of the main bearing surface.

DETAILED DESCRIPTION OF THE PREFERRED EMBODIMENT

Figure 1:
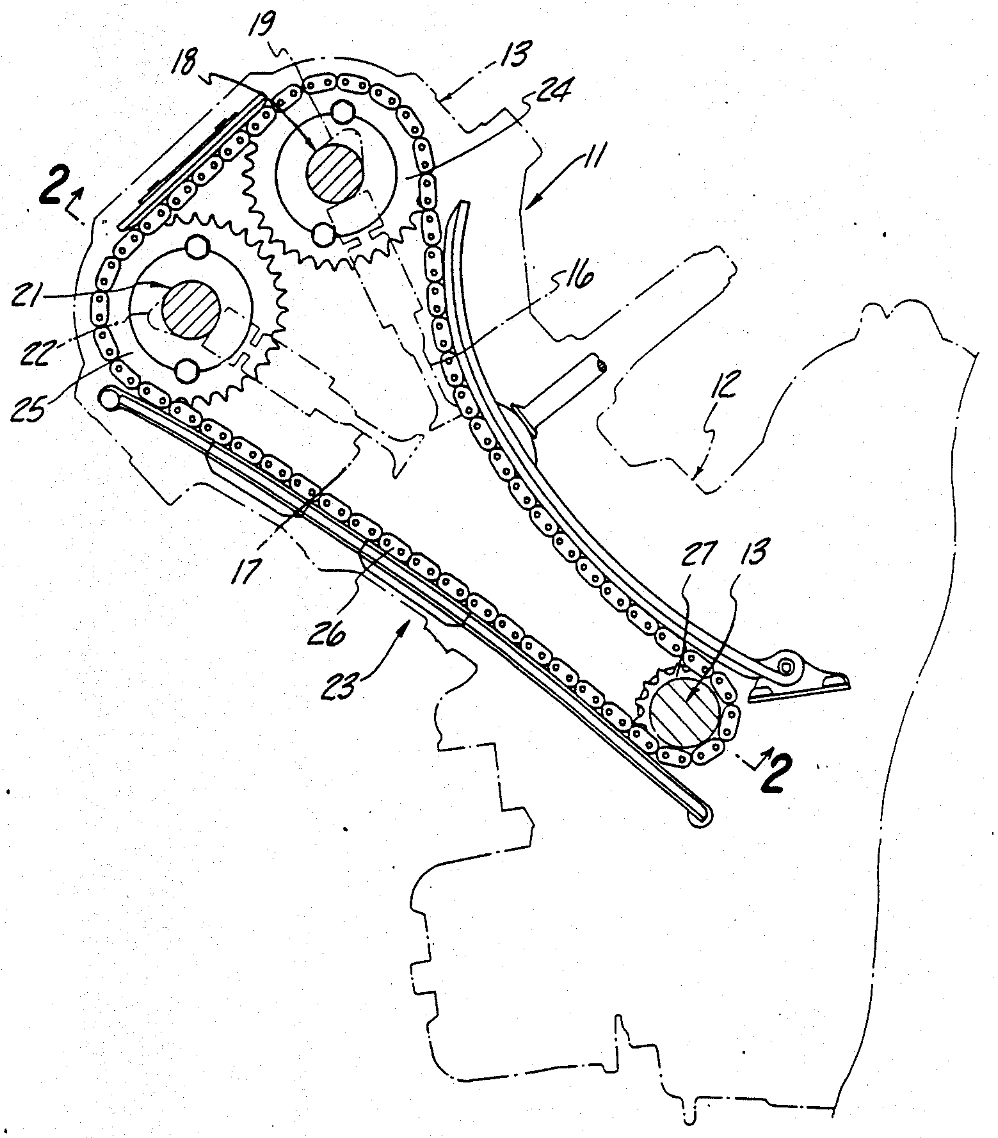
FIG. 1 is a front elevational view of an internal combustion engine embodying a camshaft drive constructed in accordance with an embodiment of the invention. The camshaft drive is shown in solid lines and the remainder of the engine is shown in phantom.

In FIG. 1, an internal combustion engine having a camshaft drive arrangement constructed in accordance with an embodiment of the invention is identified generally by the reference numeral 11. The engine 11 may be of any general type and is depicted as having a cylinder block 12 to which a cylinder head assembly 16 is affixed in any suitable manner. The cylinder block 12 is formed, as is common in this art, with one or more cylinder bores in which pistons are supported for reciprocation and which are coupled by connecting rods (none of which elements have been illustrated) to a crankshaft, indicated generally by the reference numeral 13. For this purpose, the crankshaft 13 has a plurality of throws 14 that form connecting rod journal portions for their connection to the connecting rods. Main bearing surfaces 15 are also formed on the crankshaft 13 in proximity to the throws 14 for journaling the crankshaft within bearing surfaces 20 that may be formed either with the cylinder block or its crankcase and suitable bearing caps.

Each combustion chamber of the engine is provided with at least one intake valve 16 and one exhaust valve 17, which valves are supported by the cylinder head 13 and control the communication of respective intake and exhaust passages with the combustion chamber. The intake valves 16 are all operated by means of an overhead mounted intake camshaft 18 having individual lobes 19 that cooperate with the intake valves 16 for their actuation in a known manner. In a like manner, the exhaust valves 17 are operated from an overhead mounted camshaft 21 having cam lobes 22 that cooperate with the exhaust valves 17 also in a known manner. The construction of the engine as thus far described is conventional and, for that reason, the details of the various componets have not been spelled out and some of the components have not been illustrated.

In accordance with the invention, a camshaft drive arrangement, indicated generally by the reference numeral 23, is provided for driving the camshafts 18 and 21 in timed sequence with the crankshaft 13. For this purpose, sprocket wheels 24 and 25 are affixed to the camshafts 18 and 21 for driving them. In accordance with the invention, the sprocket wheels 24 and 25 are smaller than heretofore used, because of the smaller diameter driving sprocket to be described. As a result, it is quite possible to position the camshafts 18 and 21 in relatively close proximity so that a single chain 26 can be employed to drive both sprockets 24 and 25 without any interference.

Figure 2:
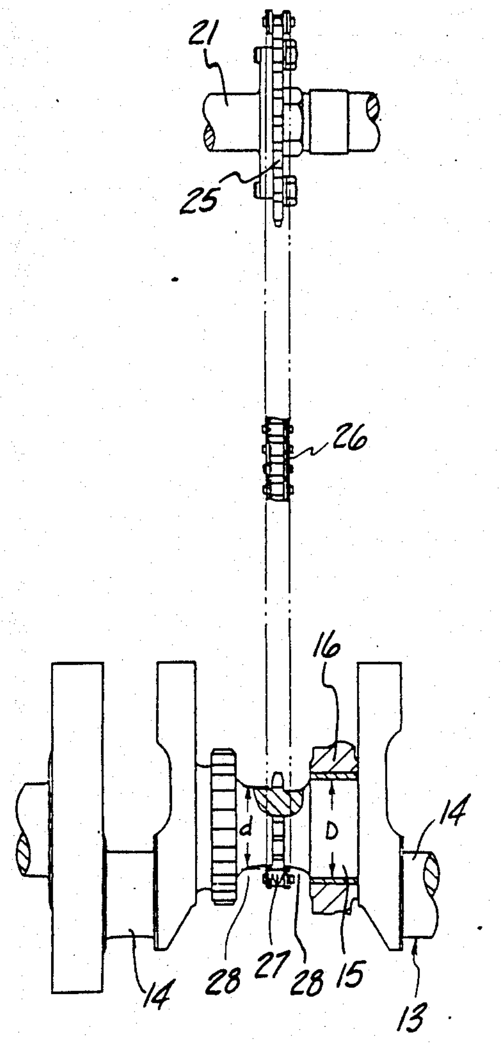
FIG. 2 is a cross-sectional view taken along the line 2—2 of FIG. 1.

In the illustrated embodiment, the camshaft driving sprockets 24 and 25 are positioned between the ends of the camshafts 18 and 21 and between a pair of cylinders. A driving sprocket 27 is formed integrally on a portion 28 of the crankshaft 13 between a pair of the throws 14 and specifically adjacent the bearing surface 15. The driving sprocket 27 has its dedendum circle "d" of a diameter that is smaller than the diameter "D" of the bearing surface 15. In this way, it is possible to employ a small driving sprocket and yet minimize the stresses and stress concentrations on the crankshaft 13. Because the driving sprocket 27 is smaller than normal, the driven sprockets 24 and 25 may be smaller than normal and a compact arrangement, as aforenoted, is possible. As may be seen from FIG. 2, the dedendum circle "d" of the gear is substantially the same diameter as the adjacent portions of the crankshaft 13. In this way, there will be no stress risers that could cause premature failure.

It is to be understood that the foregoing is a description of a preferred embodiment of the invention and that various changes and modifications may be made without departing from the spirit and scope of the invention, as defined by the appended claims.

We claim:

1. A timing drive for driving an overhead mounted camshaft from the crankshaft of an internal combustion engine, said crankshaft having at least one main bearing surface fromed therein for journaling said crankshaft for rotation and a sprocket adjacent said main bearing surface for driving the camshaft, said sprocket having its dedendum diameter smaller than the diameter of said main bearing surface, said crankshaft having a plurality of throws and said sprocket being formed between an adjacent pair of the throws, said dedendum diameter being substantially the same as the diameter of the adjacent portions of said crankshaft.

* * * * *